(12) United States Patent
Cutler

(10) Patent No.: US 6,940,922 B2
(45) Date of Patent: Sep. 6, 2005

(54) RESPONSE CALIBRATION METHOD USING A FREQUENCY-SHIFTED RECEIVER

(75) Inventor: Robert T. Cutler, Everett, WA (US)

(73) Assignee: Agilent Technologies, Inc., Palo Alto, CA (US)

(*) Notice: Subject to any disclaimer, the term of this patent is extended or adjusted under 35 U.S.C. 154(b) by 764 days.

(21) Appl. No.: 09/974,627

(22) Filed: Oct. 10, 2001

(65) Prior Publication Data

US 2003/0072391 A1 Apr. 17, 2003

(51) Int. Cl.$^7$ ................................................. H03K 9/00
(52) U.S. Cl. ..................... 375/316; 375/224; 455/67.11
(58) Field of Search ................................ 375/224, 226, 375/227, 285, 316, 346; 455/67.11, 67.13, 67.14, 67.16, 114.2, 114.3, 115.1, 226.1, 226.2

(56) References Cited

U.S. PATENT DOCUMENTS

| | | | | |
|---|---|---|---|---|
| 6,269,131 B1 | * | 7/2001 | Gothe et al. | 375/346 |
| 6,385,237 B1 | * | 5/2002 | Tsui et al. | 375/228 |
| 6,535,560 B1 | * | 3/2003 | Masenten | 375/261 |
| 6,636,722 B1 | * | 10/2003 | Dalebroux et al. | 455/67.11 |
| 6,748,031 B1 | * | 6/2004 | Piirainen | 375/340 |
| 6,775,322 B1 | * | 8/2004 | Zangi et al. | 375/232 |
| 2002/0154719 A1 | * | 10/2002 | Niva et al. | 375/354 |

OTHER PUBLICATIONS

Bernard Widrow and Samuel Sterns—"Adaptive Signal Processing"; Prentice–Hall, Copyright 1985; ISBN 0-13-004029-0 p. 204—Channel Estimation; p. 206—Applications Part IV.

David R. Smith—"Digital Transmission Systems"; Wiley, John & Sons, Inc., Jun. 1985; ISBN 0534033822; p. 319—Equalization.

Pending U.S. Appl. No. 09/974,504 filed Oct. 10, 2001; inventor—Robert T. Cutler.

* cited by examiner

Primary Examiner—Chieh M. Fan
(74) Attorney, Agent, or Firm—John L. Imperato

(57) ABSTRACT

In a response calibration method, a stimulus signal having a non-zero bandwidth is coupled to a receiver through a signal path that introduces distortion to the stimulus signal. The receiver acquires a first digital representation of the stimulus signal at an output of the signal path with the receiver adjusted to a first spectral position, and acquires a second digital representation of the stimulus signal at the output of the signal path with the receiver adjusted to a second spectral position that is shifted from the first spectral position by a predetermined frequency offset. The frequency response of the receiver when the receiver adjusted to the first spectral position is equated to the frequency response of the receiver when the receiver is adjusted to the second spectral position. A first combined frequency response of the receiver and the signal path is extracted at three or more designated frequencies within the bandwidth of the stimulus signal, and a second combined frequency response of the receiver and signal path is extracted at a set of frequencies offset from the three or more designated frequencies by the predetermined frequency offset. The frequency response of the receiver is determined from the first combined frequency response and the second combined frequency response. The frequency response of the signal path is optionally determined according to the response calibration method under condition that the stimulus signal is known, characterized, designated or otherwise established.

10 Claims, 4 Drawing Sheets

US 6,940,922 B2

RESPONSE CALIBRATION METHOD USING A FREQUENCY-SHIFTED RECEIVER

BACKGROUND OF THE INVENTION

Many types of measurement and communication systems include a receiver coupled to a signal source through a signal path. Performance of these systems can be limited by amplitude unflatness, group delay variations and other distortion in the receiver or signal path. Calibration schemes, which include determining the frequency response of the receiver or signal path, are used to overcome performance limitations that are attributed to distortion. Known calibration schemes, such as those employed in dynamic signal analyzers, vector signal analyzers and other types of receivers, use the signal source to stimulate the receiver with a known stimulus signal. Response of the receiver to the known stimulus signal is determined and compared to a predicted response to correct for distortion introduced by the receiver. However, when the signal path coupling the source to the receiver introduces distortion to the stimulus signal, the accuracy of this calibration technique relies on both the accuracy with which the stimulus signal is known and the accuracy with which the signal path can be characterized. There is a need for a response calibration method that does not rely on accurately determining the characteristics of the stimulus signal and an accurate characterization of the signal path.

SUMMARY OF THE INVENTION

In a response calibration method constructed according to an embodiment of the present invention, a stimulus signal having a non-zero bandwidth is coupled to a receiver through a signal path that introduces distortion to the stimulus signal. The receiver acquires a first digital representation of the stimulus signal at an output of the signal path with the receiver adjusted to a first spectral position. The receiver also acquires a second digital representation of the stimulus signal at the output of the signal path with the receiver adjusted to a second spectral position that is shifted from the first spectral position by a predetermined frequency offset. The frequency response of the receiver when the receiver adjusted to the first spectral position is equated to the frequency response of the receiver when the receiver is adjusted to the second spectral position. A first combined frequency response of the receiver and the signal path is extracted at three or more designated frequencies within the bandwidth of the stimulus signal, and a second combined frequency response of the receiver and signal path is extracted at a set of frequencies offset from the three or more designated frequencies by the predetermined frequency offset. The frequency response of the receiver is determined from the first combined frequency response and the second combined frequency response. The frequency response of the signal path is optionally determined according to the response calibration method under condition that the stimulus signal is known, characterized, designated or otherwise established.

DETAILED DESCRIPTION OF THE EMBODIMENTS

Figure 1:
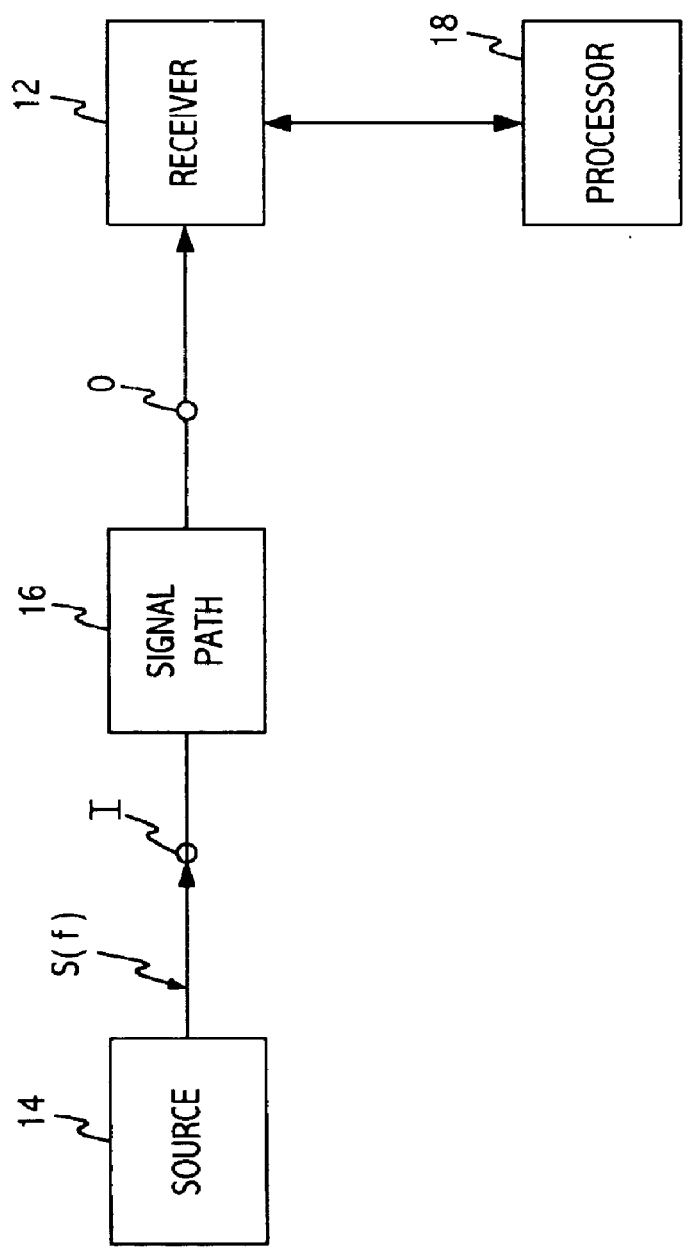
FIG. 1 shows an example of a receiver, signal path, and source employing the response calibration method constructed according to an embodiment of the present invention.

FIG. 1 shows an example of a receiver 12, a source 14, a signal path 16 and a processor 18 employing the response calibration method constructed according to an embodiment of the present invention. The frequency response of the receiver 12 is determined according to the response calibration method. From the determined frequency response of the receiver 12, a time domain impulse response, or any other response suitable for calibrating the receiver 12 can be determined using the known mappings between the frequency domain and the time domain.

Figure 2A:
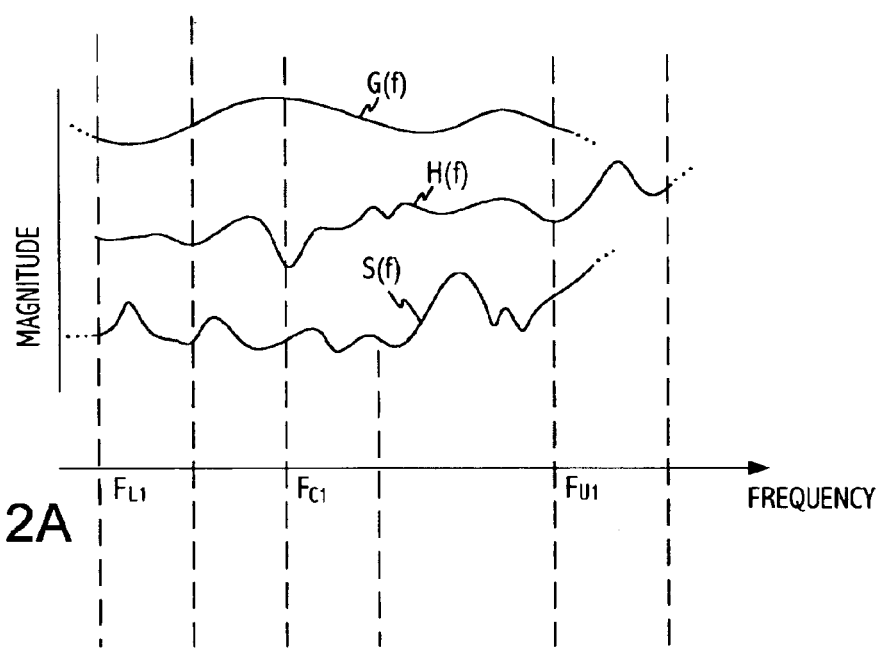
FIGS. 2A–3B show examples of stimulus signals and frequency responses of the receiver and the signal path included in the response calibration method constructed according to the embodiment of the present invention.
Figure 2B:
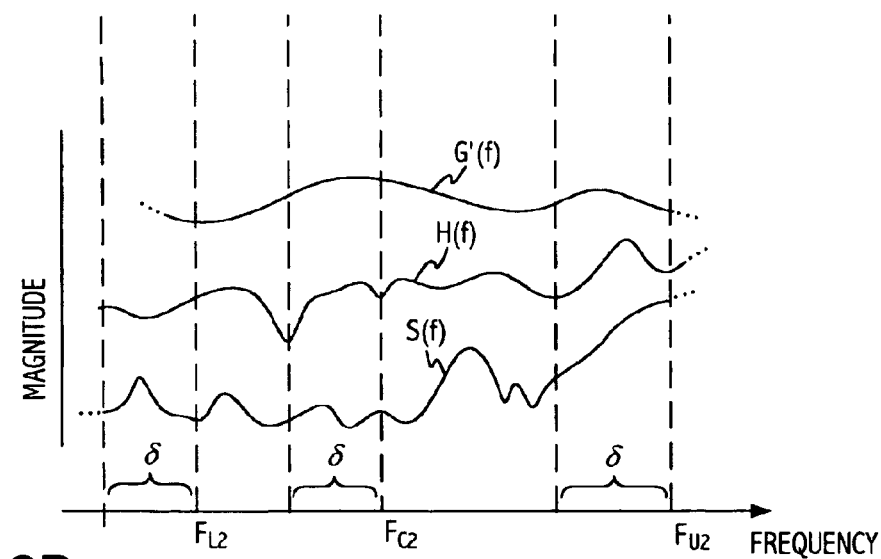
Figure 3A:
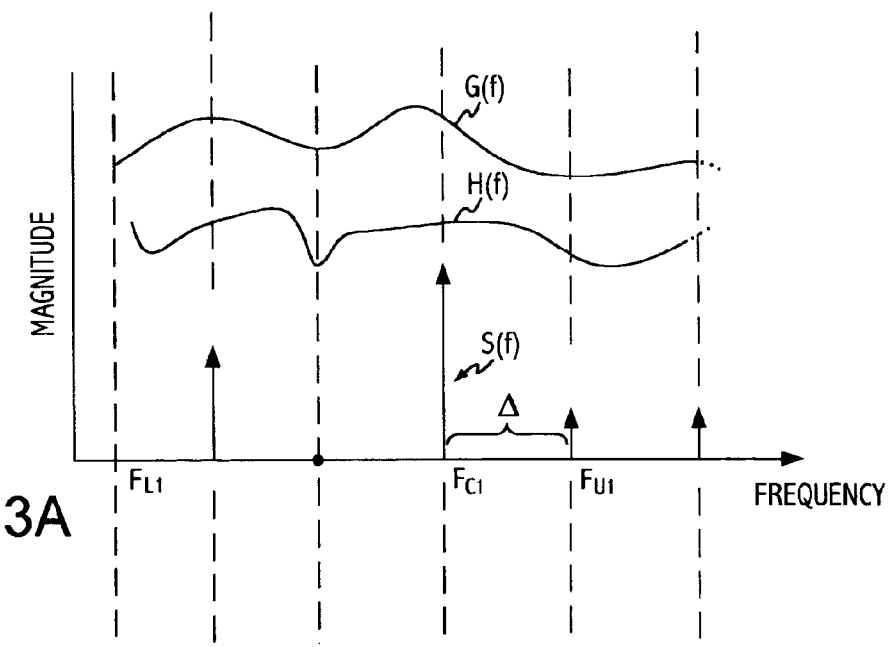
Figure 3B:
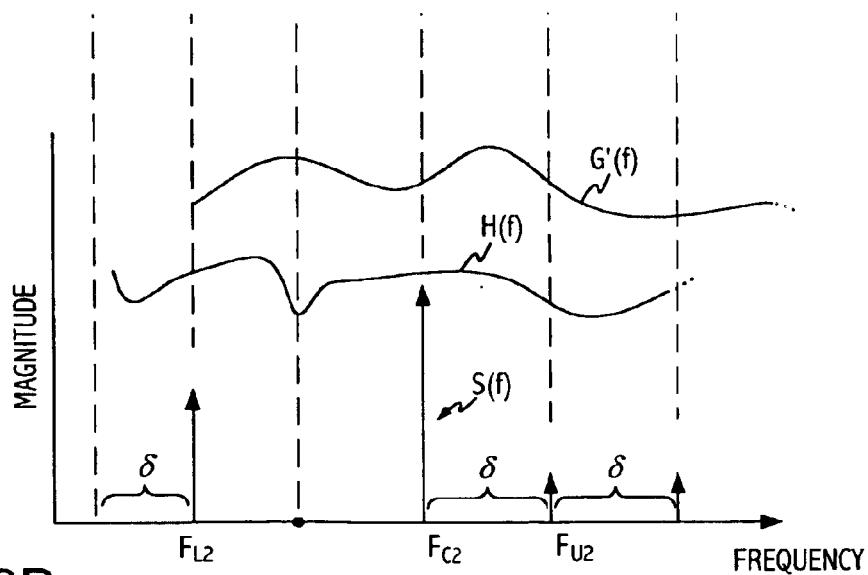

The source 14 provides a stimulus signal S(f) that has non-zero bandwidth. The stimulus signal S(f) has a continuous spectrum as shown in FIGS. 2A and 2B. Alternatively, the stimulus signal S(f) has a discrete spectrum as shown in FIGS. 3A and 3B, where the stimulus signal S(f) is a frequency comb with discrete teeth separated by a frequency spacing Δ.

Through the signal path 16, the stimulus signal S(f) is coupled to the receiver 12. The signal path 16 has an input I coupled to the source 14 and an output O coupled to the receiver 12. The signal path 16 is typically a mixer or other active element, a transmission line, filter or other passive element, or combination of active and passive elements having a frequency response H(f). Typically, the signal path 16 modifies the amplitude and/or the phase of the stimulus signal S(f) between the input I and the output O of the signal path 16. The frequency response H(f) of the signal path 16 is optionally determined according to the response calibration scheme under condition that the stimulus signal S(f) is known, characterized, designated or otherwise established.

The receiver 12 is a dynamic signal analyzer, vector signal analyzer, heterodyne system or other frequency translating or shifting system, and has a frequency response G(f). The frequency response G(f) of the receiver 12 has the characteristic that the relative amplitudes and relative phases of the frequency response G(f) remain fixed whether the receiver 12 is in a first spectral position $F_{C1}$ or in a second spectral position $F_{C2}$ resulting in the receiver response G'(f). The receiver 12 intercepts the stimulus signal S(f) at the output of the signal path 16 and acquires a first digital representation Y1(f) of the stimulus signal at the output O of the signal path 16 with the receiver 12 adjusted to the first spectral position $F_{C1}$. The first digital representation Y1(f) is a product expressed in equation 1.

$$Y1(f) = S(f)H(f)G(f). \quad (1)$$

The receiver 12 intercepts the stimulus signal S(f) at the output of the signal path 16 and acquires a second digital representation Y2(f) of the stimulus signal at the output O of the signal path 16 with the receiver 12 adjusted to the second spectral position $F_{C2}$ that is frequency-shifted from the first spectral position $F_{C1}$ by a frequency offset δ. The second digital representation is a product expressed in equation 2.

$$Y2(f) = S(f)H(f)G'(f). \quad (2)$$

In equation 2, the frequency-shifted frequency response G'(f) of the receiver 12 represents the frequency response G(f) of the receiver 12 shifted by the frequency offset δ. Thus, G'(f+δ)=G(f), indicating that the second spectral position $F_{C2}$ is at a higher frequency than the first spectral position $F_{C1}$ as shown in FIGS. 2A–3B.

In FIG. 1, the processor 18 is coupled to the receiver 12. Typically, the processor 18 is a microprocessor or computer that is either incorporated within the receiver 12, or that is external to the receiver 12. The processor 18 extracts a first combined frequency response $X1_k$ of the receiver 12 and the signal path 16 at at least three designated frequencies $f_k$ within the bandwidth of the stimulus signal S(f). This first combined frequency response $X1_k=H(f_k)G(f_k)$, where k=0, 1, 2 . . . N−1, an integer indexing each of the designated frequencies $f_k$.

The first combined frequency response $X1_k$ is obtained by normalizing the first digital representation $Y1(f_k)$ by the stimulus signal S(f) at the three or more designated frequencies $f_k$. According to the normalization, $X1_k=Y1(f_k)/S(f_k)$, where $S(f_k)$ represents the stimulus signal S(f) at the designated frequencies $f_k$. Alternatively, the first combined frequency response $X1_k$ is obtained by adaptive filtering to obtain a combined impulse response of the signal path 16 and the receiver 12. Mapping this combined impulse response into the frequency domain provides the first combined frequency responsey $X1_k$ at the three or more designated frequencies $f_k$.

The processor 18 extracts a second combined frequency response $X2_k$ of the receiver 12 and the signal path 16 at a set of frequencies offset from the three or more designated frequencies $f_k$ by the frequency offset δ. This second combined frequency response $X2_k=H(f_{k+1})G'(f_{k+1})$, where k=0, 1, 2 . . . N−1, where $G'(f_{k+1})=G(f_k)$, indicating that the second spectral position $F_{C2}$ is at a higher frequency than the first spectral position $F_{C1}$.

The second combined frequency response $X2_k$ is obtained by normalizing the second digital representation Y2(f) by the stimulus signal S(f) at the set of frequencies designated as $f_{k+1}$. According to the normalization, $X2_k=Y2(f_{k+1})/S(f_{k+1})$. Alternatively, the second combined frequency response $X2_k$ is obtained by adaptive filtering to obtain the impulse response of the signal path 16 and the receiver 12. Mapping the obtained impulse response to the frequency domain provides the second combined frequency response $X2_k$ at the set of frequencies $f_{k+1}$. In addition to using normalization or adaptive filtering to extract the combined frequency responses $X1_k$ and $X2_k$, cross-correlation, cross spectrum analysis, adaptive channel modeling and other known techniques are alternatively used to extract the combined frequency responses $X1_k$ and $X2_k$.

The number and the spacing of the designated frequencies $f_k$ are chosen so the frequency response G(f) of the receiver 12 is determined to a specified accuracy. The accuracy to which the frequency response G(f) is determined generally increases as the number of designated frequencies $f_k$ increases and as the spacing of the designated frequencies $f_k$ decreases. In an example where the stimulus signal S(f) is a frequency comb, the frequency offset δ between the first spectral position $F_{C1}$ and the second spectral position $F_{C2}$ is chosen to be equal to the frequency spacing Δ of the teeth of the frequency comb. Alternatively, when the frequency offset δ is not equal to the frequency spacing Δ, interpolation is used to acquire the first combined frequency response $X1_k$ and the second combined frequency response $X2_k$.

The processor 18 equates the frequency response G(f) of the receiver 12 to the frequency response G'(f) of the receiver 12, where the frequency response G'(f) is shifted from the frequency response G(f) by the frequency offset δ. This corresponds to the shifting of the frequency response of the receiver 12 from the first spectral position $F_{C1}$ to the second spectral position $F_{C2}$. FIGS. 2B and 3B show the frequency response G(f) shifted between the first spectral position $F_{C1}$ and the second spectral position $F_{C2}$, resulting in the frequency response G'(f). According to this frequency shifting, $G(F_{L1}+kδ)=G'(F_{L2}+kδ)=G(F_{L2}+(k-1)δ)$ where $F_{L1}$ represents a lower spectral bandwidth position when the receiver 12 is in the first spectral position $F_{C1}$ and where $F_{L2}$ represents a lower spectral bandwidth position when the receiver 12 is in the second spectral position $F_{C2}$. In the first spectral position $F_{C1}$, shown in FIG. 2A and FIG. 3A, the receiver response G(f) has a spectral bandwidth that extends from $F_{L1}$ to $F_{U1}$. In the second spectral position $F_{C2}$, shown in FIG. 2B and FIG. 3B, the receiver response G'(f) has a spectral bandwidth that extends from $F_{L2}$ to $F_{U2}$. The non-zero bandwidth of the stimulus signal S(f) extends at least as broad as the frequency range from $F_{L1}$ to $F_{U2}$. Generally, the responses of the signal path 16 and the receiver 12, and the stimulus signal are vector quantities having magnitude and phase components. FIGS. 2A–2B show the magnitude components versus frequency.

The processor 18 then determines the frequency response G(f) of the receiver 12 and the frequency response H(f) of the signal path 16 at frequencies $f_k$ from the extracted first combined response $X1_k$ and the extracted second combined frequency response $X2_k$. A time domain impulse response, or any other response suitable for calibrating the receiver 12 is optionally derived from the frequency response G(f), based on known mappings between the frequency domain and the time domain. The frequency response G(f) of the receiver 12 is determined according to equation 3 and equation 4. The frequency response H(f) of the signal path 16 is optionally determined according to equation 3 and equation 4.

$$X1_k = G_k H_k \quad (3)$$

$$X2_k = G_k H_{k+1} \quad (4)$$

where $G_k=G(f_k)$, and $H_k=H(f_k)$.

Table 1A shows correspondence between the three or more designated frequencies $f_k$, the extracted first combined frequency responses $X1_k$, the frequency response $H_k$ of the signal path 16 and the frequency response $G_k$ of the receiver 12 in the example where three frequencies $f_k$ have been designated. Table 1B shows correspondence between the set of frequencies $f_{k+1}$, the extracted second combined frequency responses $X2_k$, the frequency response $H_{k+1}$ of the signal path 16 and the frequency response $G_k$ of the receiver 12 in the example where there are three designated frequencies $f_k$.

TABLE 1A

| $f_0$: | $X1_0$ | $G_0$ | $H_0$ |
| $f_1$: | $X1_1$ | $G_1$ | $H_1$ |
| $f_2$: | $X1_2$ | $G_2$ | $H_2$ |

TABLE 1B

| $f_1$: | $X2_0$ | $G_0$ | $H_1$ |
| $f_2$: | $X2_1$ | $G_1$ | $H_2$ |
| $f_3$: | $X2_2$ | $G_2$ | $H_3$ |

The application of equation 3 and equation 4 provides the frequency response $G_k$ of the receiver 12 at the designated frequencies $f_k$. First, an initial designation for the frequency response of the signal path 16 is made at one of the frequencies $f_0$–$f_N$. For example, the initial designation is made for the frequency response $H_0$ of the signal path 16 at the first of the designated frequencies $f_0$. Using the extracted first combined frequency response $X1_0$ at frequency $f_0$, the frequency response $G_0$ of the receiver 12 at frequency $f_0$ is determined according to equation 3 as $X1_0/H_0$. Using the extracted second combined frequency response $X2_0$ at frequency $f_1$, and substituting the determined frequency response $G_0$ into equation 4 provides that the frequency response $H_1$ of the signal path 16 at frequency $f_1$ equals $X2_0/G_0$. Using the extracted first combined frequency response $X1_1$ at frequency $f_1$ and substituting $H_1$ into equation 3 provides that the frequency response $G_1$ of the receiver 12 at frequency $f_1$ equals $X1_1/H_1$. Using the extracted second combined frequency response $X2_1$ at frequency $f_2$ and substituting $G_1$ into equation 4 provides that the frequency response $H_2$ of the signal path 16 at frequency $f_2$ equals $X2_1/G_1$. Using the extracted first combined frequency response $X1_2$ at frequency $f_2$ and substituting $H_2$ into equation 3 provides that the frequency response $G_2$ of the receiver 12 at frequency $f_2$ equals $X1_2/H_2$. Using the extracted second combined frequency response $X2_2$ at frequency $f_3$ and substituting $G_2$ into equation 4 provides that the frequency response $H_3$ of the signal path 16 at frequency $f_3$ equals $X2_2/G_2$.

In this example, the designated frequencies $f_0 \ldots f_3$ are used to illustrate the application of equation 3 and equation 4 to determine the frequency response $G_k$. When there are more than three designated frequencies $f_k$, the initial designation of the frequency response of the signal path 16 at one of the frequencies $f_0$–$f_N$ and the similar application of equation 3 and equation 4 are used to determine the frequency response $G_k$. Once the frequency response $G_k$ of the receiver 12 is determined, the receiver 12 can be calibrated by compensating for amplitude unflatness, group delay variations and other distortion in the receiver 12, that in the absence of calibration, can limit the performance of the receiver 12.

Under condition that the stimulus signal S(f) is known, characterized, designated or otherwise established at the designated frequencies $f_0$–$f_N$, the frequency response $H_0$–$H_N$, determined through the application of equation 3 and equation 4, accurately represents the frequency response of the signal path 16. A time domain impulse response, or any other response suitable for calibrating the signal path 16 is optionally derived from the frequency response $H_k$ of the signal path 16, based on known mappings between the frequency domain and the time domain. Thus, the response of the signal path 16 is optionally determined according to the response calibration scheme. Once the response of the signal path 16 is determined, the signal path 16 can be calibrated by compensating for amplitude unflatness, group delay variations and other distortion in the signal path 16.

Figure 4:
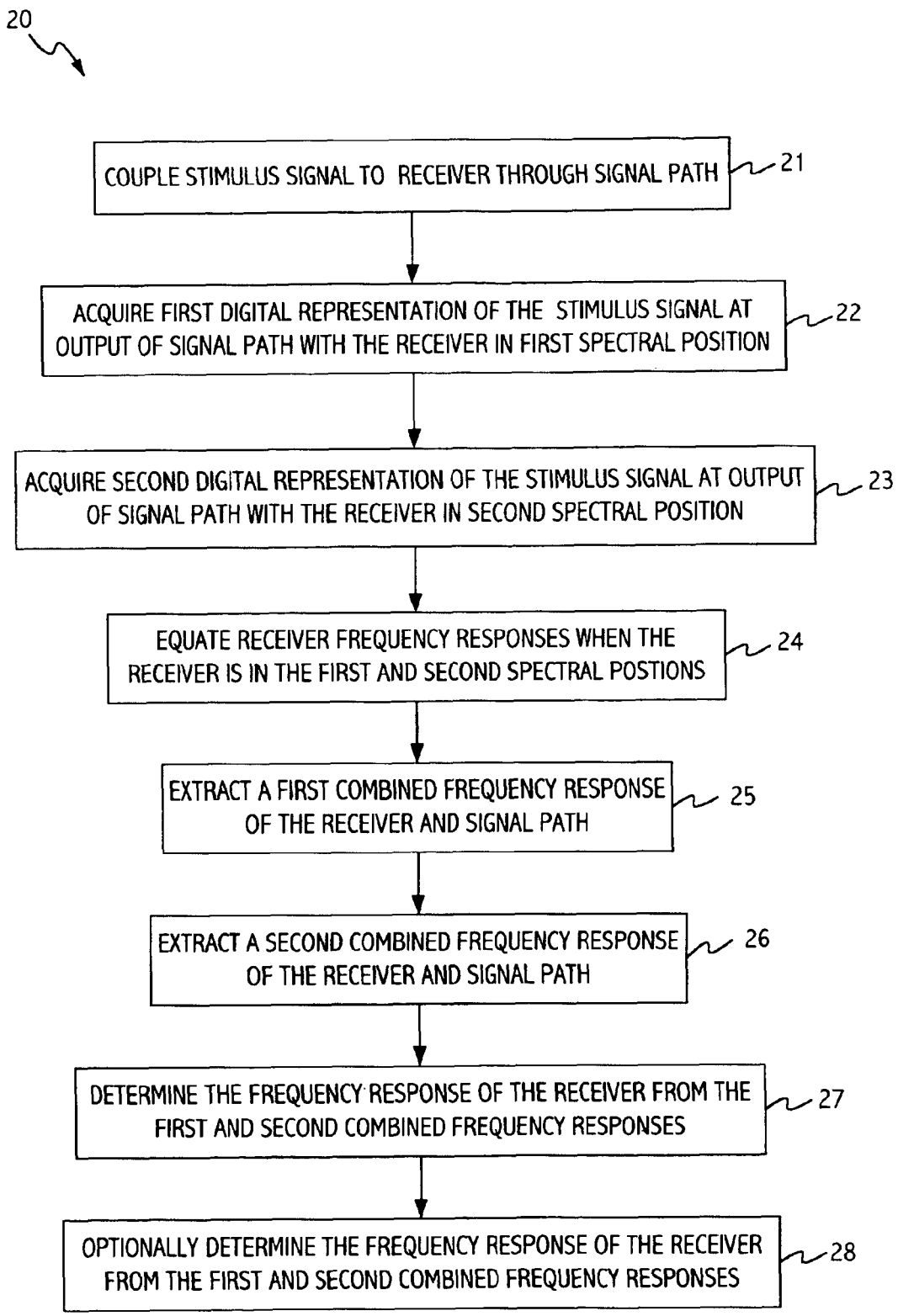
FIG. 4 is a flow diagram of the response calibration method constructed according to the embodiment of the present invention.

FIG. 4 is a flow diagram of the response calibration method 20 constructed according to the embodiment of the present invention. In step 21 of the method 20, the stimulus signal S(f) having non-zero bandwidth is coupled to the receiver 12 through the signal path 16. In step 22, the receiver 12 acquires the first digital representation Y1(f) of the stimulus signal at the output O of the signal path 16 with the receiver 12 in a first spectral position $F_{C1}$. In step 23, the receiver 12 acquires the second digital representation Y2(f) of the stimulus signal at the output O of the signal path 16 with the receiver 12 in a second spectral position $F_{C2}$ shifted from the first spectral position $F_{C1}$ by the predetermined frequency offset δ. In step 24, the frequency response G(f) of the receiver 12 when the receiver 12 is in the first spectral position $F_{C1}$ is equated to the frequency response G'(f) of the receiver 12 when the receiver 12 is frequency-shifted to the second spectral position $F_{C2}$.

In step 25, the first combined frequency response $X1_k$ of the receiver 12 and the signal path 16 is extracted at at least three designated frequencies $f_k$ within the bandwidth of the stimulus signal S(f). Extracting the first combined frequency response $X1_k$ of the receiver 12 and the signal path 16 at the at least three designated frequencies $f_k$ includes normalizing the first digital representation Y1(f) by the stimulus signal at the at least three predesignated frequencies $f_k$.

In step 26, the second combined frequency response $X2_k$ of the receiver 12 and signal path 16 is extracted at the set of frequencies $f_{k+1}$ within the bandwidth of the stimulus signal S(f). Extracting the second combined frequency response $X2_k$ of the receiver 12 and the signal path 16 the set of frequencies $f_{k+1}$ includes normalizing the second digital representation Y2(f) by the stimulus signal S(f) at the set of frequencies $f_{k+1}$. In addition to using normalization to extract the combined frequency responses $X1_k$ and $X2_k$, adaptive filtering, cross-correlation, cross spectrum analysis, adaptive channel modeling and other known techniques are alternatively used to extract the combined frequency responses $X1_k$ and $X2_k$.

In step 27, the frequency response of the receiver 12 is determined from the first combined frequency response $X1_k$ and the second combined frequency response $X2_k$. Determining the frequency response $G_k$ of the receiver 12 from the first combined frequency response $X1_k$ and the second combined frequency response $X2_k$ includes designating a response of the signal path 16 at a predetermined one of the at least three designated frequencies $f_0$–$f_N$ within the bandwidth of the stimulus signal and solving for the frequency response $G_k$ of the receiver 12 according to equation 3 and equation 4.

Under condition that the stimulus signal S(f) is known, characterized, designated or otherwise established at the frequencies $f_0$–$f_N$, the frequency response $H_0$–$H_N$, determined through the application of equation 3 and equation 4, accurately represents the frequency response of the signal path 16. Thus, the frequency response of the signal path is optionally determined through the application of equation 3 and equation 4 as shown in step 28. A time domain impulse response, or any other response suitable for calibrating the receiver 12 is optionally derived from the frequency response of the signal path 16, based on known mappings between the frequency domain and the time domain.

While the embodiment of the present invention has been illustrated in detail, it should be apparent that modifications and adaptations to this embodiment may occur to one skilled in the art without departing from the scope of the present invention as set forth in the following claims.

What is claimed is:

1. A response calibration method, comprising:
    coupling a stimulus signal having a non-zero bandwidth to a receiver through a signal path;
    acquiring a first digital representation of the stimulus signal at an output of the signal path with the receiver adjusted to a first spectral position, and acquiring a second digital representation of the stimulus signal at the output of the signal path with the receiver adjusted to a second spectral position that is shifted from the first spectral position by a predetermined frequency offset;
    equating a frequency response of the receiver when the receiver is adjusted to the first spectral position to the frequency response of the receiver when the receiver is adjusted to the second spectral position, extracting a first combined frequency response of the receiver and the signal path at at least three predesignated frequencies within the non-zero bandwidth of the stimulus signal, extracting a second combined frequency response of the receiver and the signal path at a set of frequencies within the non-zero bandwidth of the stimulus signal offset from the at least three predesignated frequencies by the predetermined frequency offset, and determining the frequency response of the receiver from the first combined frequency response and the second combined frequency response.

2. The method of claim 1 wherein extracting the first combined frequency response of the receiver and the signal path includes normalizing the first digital representation by the stimulus signal at the at least three predesignated frequencies and wherein extracting the second combined frequency response of the receiver and the signal path includes normalizing the second digital representation by the stimulus signal at the set of frequencies.

3. The method of claim 1 wherein extracting the first combined frequency response of the receiver includes adaptive filtering the first digital representation and extracting the second combined frequency response of the receiver includes adaptive filtering the second digital representation.

4. The method of claim 1 wherein determining the frequency response ($G_k$) of the receiver from the first combined frequency response ($X1_k$) and the second combined frequency response ($X2_k$) includes designating a frequency response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein ($H_k$) is the frequency response of the signal path at a first frequency, ($H_{k+1}$) is the frequency response of the signal path at a second frequency, and k is an integer that indexes the at least three designated frequencies.

5. The method of claim 2 wherein determining the frequency response ($G_k$) of the receiver from the first combined frequency response ($X1_k$) and the second combined frequency response ($X2_k$) includes designating a frequency response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein ($H_k$) is the frequency response of the signal path at a first frequency, ($H_{k+1}$) is the frequency response of the signal path at a second frequency, and k is an integer that indexes the at least three designated frequencies.

6. The method of claim 3 wherein determining the frequency response ($G_k$) of the receiver from the first combined frequency response ($X1_k$) and the second combined frequency response ($X2_k$) includes designating a frequency response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein ($H_k$) is the frequency response of the signal path at a first frequency ($H_{k+1}$) is the frequency response of the signal path at a second frequency, and k is an integer that indexes the at least three designated frequencies.

7. The method of claim 1 further comprising determining the frequency response ($H_k$) of the signal path from the first combined frequency response ($X1_k$) and the second combined frequency response ($X2_k$) by designating a response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three designated frequencies.

8. The method of claim 2 further comprising determining the frequency response ($H_k$) of the signal path from the first combined frequency response ($X1_k$) and the second combined frequency response ($X2_k$) by designating a response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three designated frequencies.

9. The method of claim 3 further comprising determining the frequency response ($H_k$) of the signal path from the first combined frequency response ($X1_k$) and the second combined frequency response ($X2_k$) by designating a response of the signal path at a predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three designated frequencies.

10. The method of claim 4 further comprising determining the frequency response ($H_k$) of the signal path from the first combined frequency response ($X1_k$) and the second combined frequency response ($X2_k$) by designating the frequency response of the signal path at the predetermined frequency of one of the at least three predesignated frequencies and the set of frequencies within the bandwidth of the stimulus signal, and solving for the frequency response ($G_k$) of the receiver using a first equation $X1_k = G_k H_k$ and a second equation $X2_k = G_k H_{k+1}$, wherein k is an integer that indexes the at least three designated frequencies.

* * * * *

UNITED STATES PATENT AND TRADEMARK OFFICE
CERTIFICATE OF CORRECTION

PATENT NO. : 6,940,922 B2
DATED : September 6, 2005
INVENTOR(S) : Cutler

It is certified that error appears in the above-identified patent and that said Letters Patent is hereby corrected as shown below:

Title page,
Item [56], References Cited, OTHER PUBLICATIONS,
"Bernard Widrow and Samuel Sterns" reference, after "0-13-004029-0" insert -- ; --.
"Pending" reference, insert -- Copy of -- before "Pending", and after "2001;" insert -- Agilent Attorney Docket No. 10010988-1; --.

Column 8,
Line 7, after "first frequency" insert -- , --.

Signed and Sealed this

Tenth Day of January, 2006

JON W. DUDAS
*Director of the United States Patent and Trademark Office*